United States Patent
Kobayashi et al.

(10) Patent No.: US 7,610,446 B2
(45) Date of Patent: Oct. 27, 2009

(54) RAID APPARATUS, RAID CONTROL METHOD, AND RAID CONTROL PROGRAM

(75) Inventors: Akihito Kobayashi, Kawasaki (JP); Mikio Ito, Kawasaki (JP); Kazuma Takatsu, Kawasaki (JP); Koji Uchida, Kawasaki (JP); Hidejiro Daikokuya, Kawasaki (JP); Kazuhiko Ikeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 308 days.

(21) Appl. No.: 11/138,278

(22) Filed: May 27, 2005

(65) Prior Publication Data
US 2005/0216660 A1 Sep. 29, 2005

Related U.S. Application Data

(63) Continuation of application No. PCT/JP03/10624, filed on Aug. 22, 2003.

(30) Foreign Application Priority Data
Jun. 19, 2003 (WO) .................. PCT/JP03/07786

(51) Int. Cl.
G06F 12/16 (2006.01)
G06F 11/08 (2006.01)

(52) U.S. Cl. .......................... 711/114; 714/6

(58) Field of Classification Search .................. 711/114
See application file for complete search history.

(56) References Cited

U.S. PATENT DOCUMENTS 6,530,003 B2 * 3/2003 Bakke et al. ................ 711/162
6,574,709 B1 * 6/2003 Skazinski et al. ........... 711/119
2001/0002480 A1 * 5/2001 Dekoning et al. ........... 711/130
2001/0049768 A1 * 12/2001 Kato et al. .................. 711/113
2005/0216660 A1 * 9/2005 Kobayashi et al. .......... 711/113

FOREIGN PATENT DOCUMENTS

| JP | 56-127262 | 10/1981 |
|---|---|---|
| JP | 59-049240 | 3/1984 |
| JP | 59-63747 | 4/1984 |
| JP | 56-127262 | 7/1984 |
| JP | 05-073226 | 3/1993 |
| JP | 5-158631 | 6/1993 |
| JP | 2001-344154 | 12/2001 |
| JP | 2002-132459 | 5/2002 |

OTHER PUBLICATIONS

Microsoft Computer Dictionary Fifth Edition, 2002, Microsoft Press, pp. 196-197.*

* cited by examiner

Primary Examiner—Brian R Peugh
Assistant Examiner—Matthew Bradley
(74) Attorney, Agent, or Firm—Staas & Halsey LLP

(57) ABSTRACT

A RAID apparatus that at least duplicates identical data to store thus duplicated data, which, when an instruction of writing data is given, writes data to a local cache and to a mirror cache, and writes data of the local cache to a primary disk and writes data of the mirror cache to a secondary disk. When an instruction of reading out data is given, and specified data is retained in the caches, the RAID apparatus outputs valid data of the local cache or the mirror cache, while when specified data is not retained in the caches, the RAID apparatus outputs valid data of the primary disk or the secondary disk.

7 Claims, 7 Drawing Sheets

RAID APPARATUS, RAID CONTROL METHOD, AND RAID CONTROL PROGRAM

This is application is a continuing application, filed under 35 U.S.C. §111(a), of International Application PCT/JP03/10624, filed Aug. 22, 2003, it being further noted that priority is based upon International Patent Application PCT/JP03107786, filed Jun. 19, 2003.

TECHNICAL FIELD

The present invention relates to a RAID (Redundant Array of Inexpensive Disks) apparatus, RAID control method, and RAID control program that retain data sent from outside in a plurality of disks so as to improve reliability of data.

BACKGROUND ART

At first, a conventional RAID apparatus will be explained. FIG. 5 shows a block diagram indicative of the configuration of one example of a conventional RAID apparatus and a host computer. As shown in FIG. 5, a RAID apparatus 6 is connected to a host computer 1 that gives instructions of writing and reading data. The RAID apparatus 6 includes CAs (Channel Adapter) 2A, 2B, CMs (Centralized Module) 3A, 3B, 3C, 3D, and DAs (Device Adapter) 4A, 4B, 4C, 4D, and disks 5A to 5L. One RAID apparatus has a plurality of CAs. One DA manages a plurality of discs. Hereinafter, the CA 2A, CM 3A, DA 4A, disc 5A will be explained.

The CA 2A is an interface for an external device such as the host computer 1. The CM 3A is a module that performs mainly I/O processing such as cache control by the host computer 1. The CM 3A includes a CM control unit 31A, a local cache 32A, and a mirror cache 33A. A local cache of a CM is a duplicate of a mirror cache of an adjacent CM, and caches of all the CMs are cyclically duplicated. For example, as shown in FIG. 5, the local cache 32A of the CM 3A is a duplicate of a mirror cache 33B of the adjacent CM 3B, while a local cache 32D of the CM 3D is a duplicate of the mirror cache 33A of the CM 3A. By cyclically duplicating caches, even though there is raised failure in one CM, data can be recovered using an adjacent CM.

The DA 4A is a module that controls accesses to the disks 5A, 5B, and 5C. The disk 5A retains data sent from the DA 4A.

Next, the operation of writing data in the conventional RAID apparatus will be explained referring to FIG. 5. Hereinafter, the case of writing data to the local cache 32A of the CM 3A and to the mirror cache 33B of the CM 3B will be explained. In this case, the disk 5A is the primary disk, while the disk 5D is the secondary disk. Disks are duplicated when writing back data on the local cache 32A, and thus duplicated disks are referred to as the primary disk and the secondary disk, respectively. Writing back is the processing of writing back contents data of a cache to a disk.

At first, the host computer 1 sends data to be written to the RAID apparatus 6 to the CA 2A. The CA 2A writes data sent from the host computer 1 to the local cache 32A of the CM 3A and to the mirror cache 33B of the CM 3B. When writing back contents data of the caches to the disks, the CM control unit 31A duplicates data on the local cache 32A to write back thus duplicated data to the primary disk 5A and to the secondary disk 5D.

When writing data to the local cache 32A of the CM 3A, the CA 2A adds a CC (Check Code) to input data to perform the writing operation. FIG. 6 shows a diagram indicative of one example of data having a CC added thereto. The CC (8 Bytes) is composed of two pieces of information or a Block ID and a code for check, and is added every 1 Block (512 Bytes) data. The Block ID is the logical position and attribution information of data. The code for check is an error detection code to check the validity of data by employing the CRC (Cyclic Redundancy Check). The code for check is a remainder that is obtained by seeing data as one multinomial and dividing the multinomial by a generator multinomial. Employing the CRC, error of data can be detected by comparing a remainder calculated from the data with a remainder actually added to the data.

Next, the operation of reading out data in the conventional RAID apparatus will be explained referring to FIG. 7. FIG. 7 shows a flow chart for explaining the operation of reading out data in the conventional RAID apparatus. Hereinafter, the case of reading out data from the local cache 32A of the CM 3A after the writing operation illustrated using FIG. 5 will be explained.

Firstly, when the host computer 1 gives an instruction of reading-out request to the CA 2A, the CA 2A notifies the CM control unit 31A of the reading-out request (S1).

Next, the CM control unit 31A judges whether cache miss is raised or not (S2). The cache miss indicates that data specified by reading-out request does not exist in a cache, while cache hit indicates that data specified by reading-out request exists in a cache.

In the case of cache hit (S2, No), the CA 2A reads out data from the local cache 32A, and checks the validity of thus read out data using a CC (S3). In case the data on the local cache 32A is valid (S3, Yes), the CA 2A notifies the CM control unit 31A that the data is valid, and the CM control unit 31A transfers the data on the local cache 32A to the host computer 1 (S4), ending the processing. On the other hand, in case the data on the local cache 32A is invalid (S3, No), the CA 2A notifies the CM control unit 31A that the data is invalid, and the CM control unit 31A makes a response of abnormal termination to the host computer 1 (S5), ending the processing.

In the case of cache miss (S2, Yes), the CM control unit 31A requests the DA 4A to expand data of the primary disk 5A onto the local cache 32A. Next, the DA 4A reads out data from the primary disk 5A to expand thus read out data onto the local cache 32A (S6).

Next, the CA 2A reads out data from the local cache 32A, and checks the validity of thus read out data using a CC (S7). In case the data read out from the primary disk 5A is valid (S7, Yes), the CA 2A notifies the CM control unit 31A that the data is valid, and the CM control unit 31A transfers the data on the local cache 32A to the host computer 1 (S8), ending the processing. On the other hand, in case the data read out from the primary disk 5A is invalid (S7, No), the CA 2A notifies the CM control unit 31A that the data is invalid, and the CM control unit 31A requests the DA 4B to expand data of the secondary disk 5D onto the local cache 32A. Next, the DA 4B reads out data from the secondary disk 5D to expand thus read out data onto the local cache 32A (S9).

Next, the CA 2A reads out data from the local cache 32A, and checks the validity of thus read out data using a CC (S10). In case the data read out from the secondary disk 5D is valid (S10, Yes), the CA 2A notifies the CM control unit 31A that the data is valid, and the CM control unit 31A transfers the data on the local cache 32A to the host computer 1 (S11), ending the processing. On the other hand, in case the data read out from the secondary disk 5D is invalid (S10, No), the CA 2A notifies the CM control unit 31A that the data is invalid, and the CM control unit 31A makes a response of abnormal termination to the host computer 1 (S12), ending the processing.

Concerning other conventional techniques, as a peripheral storage control device for duplicated disks, there is known a peripheral storage control device that includes a buffer memory for transiently storing data sent from outside and a control unit, corresponding to the duplicated disks respectively. This peripheral storage control device writes date sent from outside to two buffer memories, and writes the data of the two buffer memories to different disks, respectively (For example, refer to Patent Document 1: Jpn. Pat. Appln. Laid-Open Publication No. 56-127262 (page 3 to page 5, FIGS. 1 and 2)).

However, even though above-described RAID apparatus 6 has a plurality of local caches and mirror caches which are cyclically duplicated, data of mirror caches is not used at the time of ordinary writing back processing. Accordingly, even if writing data to mirror caches is successfully performed, in case writing data to local caches is not successfully performed, there is raised a problem that invalid data is written to both the primary disk and the secondary disk. Furthermore, at the time of reading out data from caches, data of a mirror cache of an adjacent CM is not used so long as there is raised no failure in a CM having a local cache. That is, in a RAID apparatus having a plurality of disks and a plurality of caches with its paths for reading and writing data complicatedly formed, there may be raised a problem that data cannot be recovered depending on paths.

The present invention has an object to overcome the above-mentioned drawbacks by providing a RAID apparatus, a RAID Control Method, and a RAID Control Program that assure safety on any path at the time of writing and reading data.

DISCLOSURE OF THE INVENTION

The present invention has an object to overcome the above-mentioned drawbacks by providing a RAID apparatus that at least duplicates identical data to store thus duplicated data, including: at least one disk unit that stores the data; a plurality of cache units each of which has a local cache and a mirror cache to transiently store data; a control unit that, when an instruction of writing data is given from outside, writes data to a local cache of a first cache unit being one of the plural cache units and to a mirror cache of a second cache unit being one of the cache units other than the first cache unit, writes data of the local cache of the first cache unit to a first area of the disk unit and writes data of the mirror cache of the second cache unit to a second area other than the first area. In the embodiments of the present invention, the control units are CAs 20A, 20B and CM control units 301A to 301D, and the first disk is a primary disk 5A and the second disk is a secondary disk 5D.

In the RAID apparatus described above, when an instruction of reading out data is given from outside, and specified data is retained in the cache units, the control unit judges whether or not specified data in the local cache of the first cache unit and specified data in the mirror cache of the second cache unit are valid based on an error detection code to output the valid data.

In the RAID apparatus described above, when an instruction of reading out data is given from outside, and specified data is not retained in the cache units, the control unit judges whether or not specified data in the first area and specified data in the second area are valid based on an error detection code to output valid data.

In the RAID apparatus, when an instruction of reading out data is given from outside, and specified data is not retained in the cache units, the control unit judges whether or not specified data in the first area is valid based on an error detection code, and stores that the specified data in the first area is invalid in case the specified data in the first area is invalid to make a response of abnormal termination to outside, and when an instruction of reading out data is given from outside again, the control unit outputs specified data in the second area.

Also the above object can be attained by providing a RAID control method that at least duplicates identical data to store thus duplicated data, including: a step that, when an instruction of writing data is given from outside, writes data to a local cache of a first cache unit being one of a plurality of cache units each of which has a local cache and a mirror cache and to a mirror cache of a second cache unit being one of the cache units other than the first cache unit; a step that writes data of the local cache of the first cache unit to a first area of a disk unit; and a step that writes data of the mirror cache of the second cache unit to a second area of the disk unit.

Further, the RAID control method described above includes a step that, when an instruction of reading out data is given from outside, and specified data is retained in the cache units, judges whether or not specified data in the local cache of the first cache unit and specified data in the mirror cache of the second cache unit are valid based on an error detection code to output the valid data.

Furthermore, the RAID control method described above includes a step that, when an instruction of reading out data is given from outside, and specified data is not retained in the cache units, judges whether or not specified data in the first area and specified data in the second area are valid based on an error detection code to output the valid data.

Still further, the RAID control method includes a step that, when an instruction of reading out data is given from outside, and specified data is not retained in the cache units, judges whether or not specified data in the first area is valid based on an error detection code, and stores that the specified data in the first area is invalid in case the specified data in the first area is invalid to make a response of abnormal termination to outside, and, when an instruction of reading out data is given from outside again, outputs specified data in the second area.

Also the above object can be attained by providing a RAID control program that makes a computer carry out a RAID control method that at least duplicates identical data to store thus duplicated data, including: a step that, when an instruction of writing data is given from outside, writes data to a local cache of a first cache unit being one of a plurality of cache units each of which has a local cache and a mirror cache and to a mirror cache of a second cache unit being one of the cache units other than the first cache unit; a step that writes data of the local cache of the first cache unit to a first area of a disk unit; and a step that writes data of the mirror cache of the second cache unit to a second area of the disk unit.

Further, the RAID control program described above includes a step that, when an instruction of reading out data is given from outside, and specified data is retained in the cache units, judges whether or not specified data in the local cache of the first cache unit and specified data in the mirror cache of the second cache unit are valid based on an error detection code to output the valid data.

Furthermore, the RAID control program described above includes a step that, when an instruction of reading out data is given from outside, and specified data is not retained in the cache units, judges whether or not specified data in the first area and specified data in the second area are valid based on an error detection code to output the valid data.

Still further, the RAID control program described above includes a step that, when an instruction of reading out data is given from outside, and specified data is not retained in the cache units, judges whether or not specified data in the first area is valid based on an error detection code, and stores that the specified data in the first area is invalid in case the specified data in the first area is invalid to make a response of abnormal termination to outside, and, when an instruction of reading out data is given from outside again, outputs specified data in the second area.

In the RAID control program, a medium that can be read out by a computer may be a semiconductor memory such as a ROM and a RAM, a handheld storage media such as a CD-ROM, a flexible disk, a DVD disk, a magnetic optical disk, and an IC card, a data base that retains a computer program, other computers and their data bases.

BEST MODE FOR CARRYING OUT THE INVENTION

Embodiments of the present invention will be described below with reference to the accompanying drawings.

First Embodiment

Figure 1:
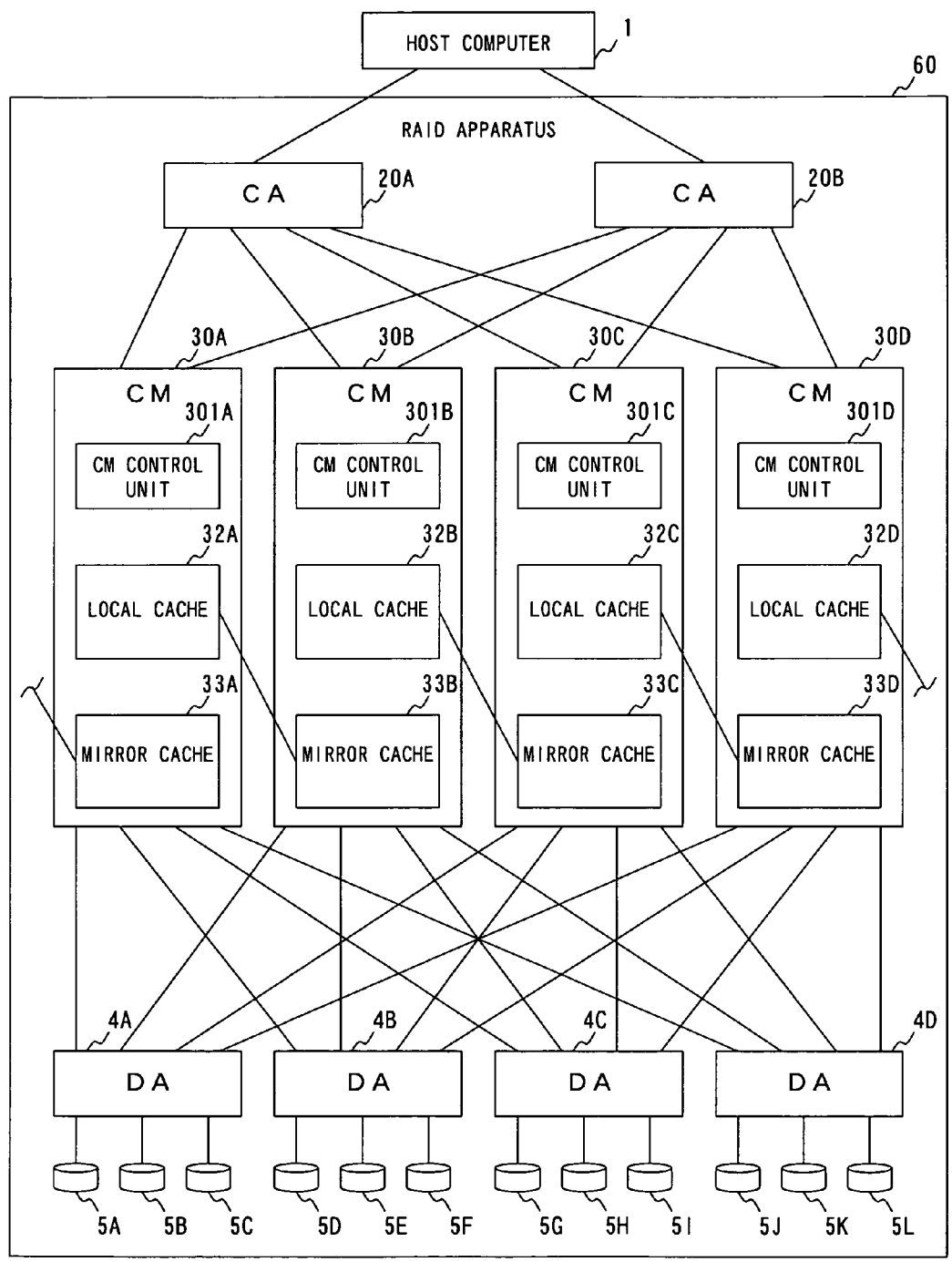
FIG. 1 shows a block diagram indicative of the configuration of one example of a RAID apparatus according to embodiments of the present invention.

FIG. 1 shows a block diagram indicative of the configuration of one example of a RAID apparatus according to embodiments of the present invention. As shown in FIG. 1, a RAID apparatus 60 according to an embodiment of the present invention is connected to a host computer 1 that gives instructions of writing and reading data.

Figure 5:
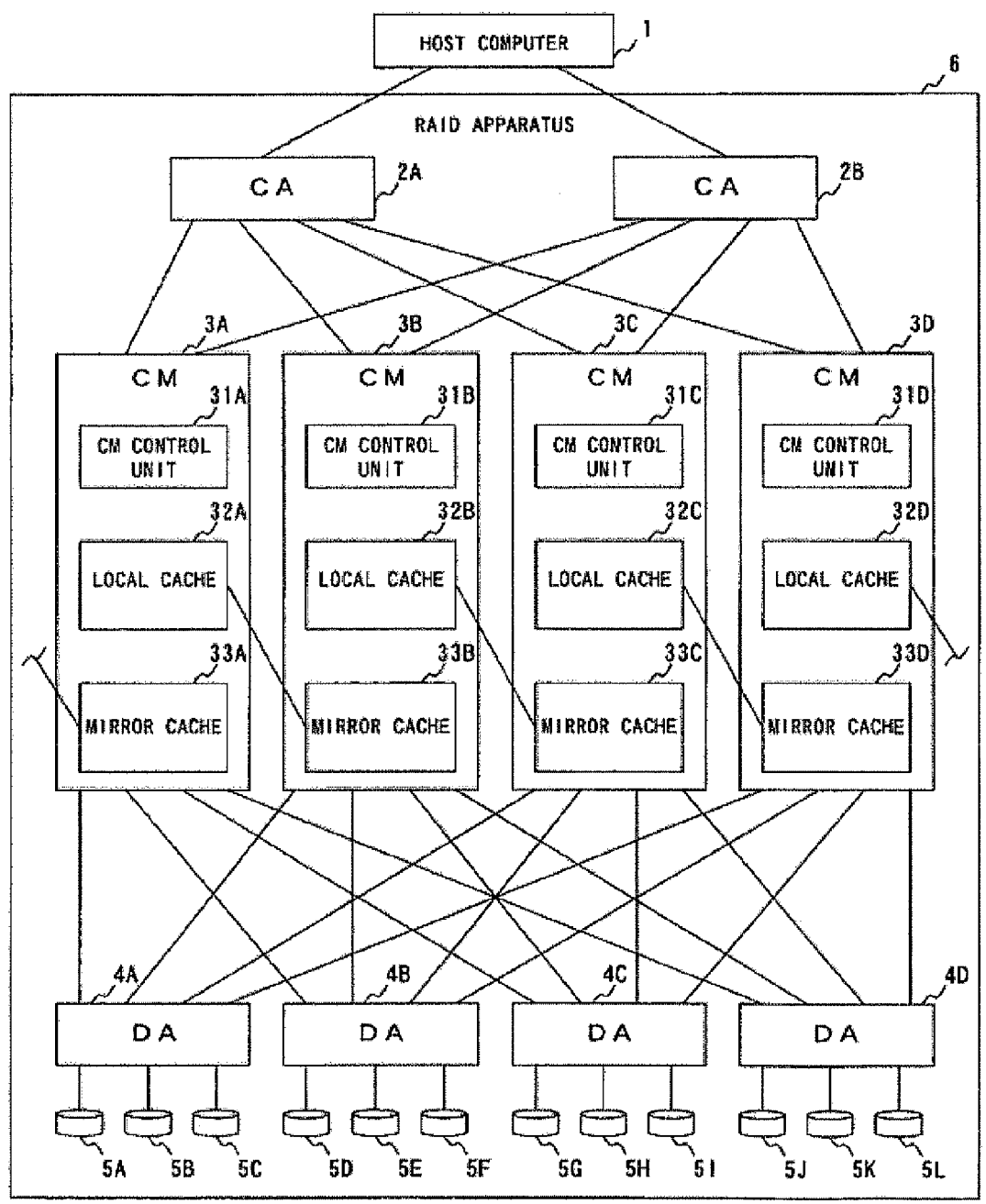
FIG. 5 shows a block diagram indicative of the configuration of one example of a conventional RAID apparatus.
Figure 6:
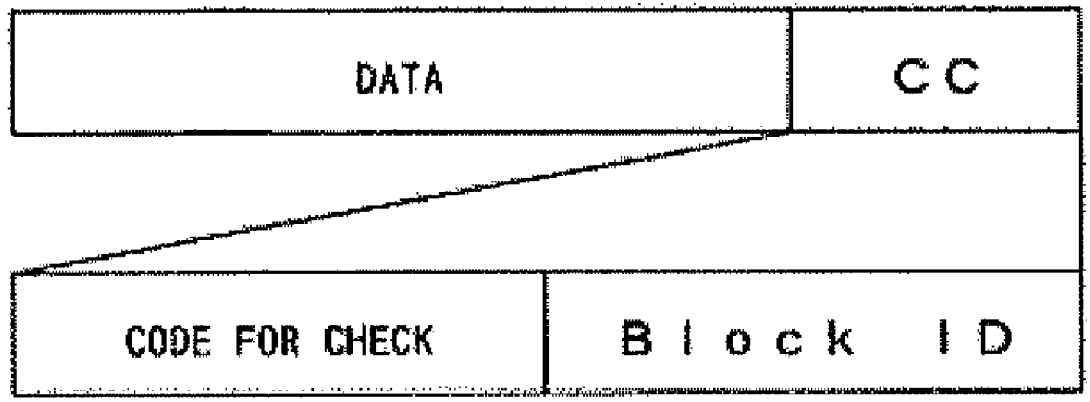
FIG. 6 shows a diagram indicative of one example of data having a CC added thereto.

The configuration of the RAID apparatus 60 is similar to that of the conventional RAID apparatus shown in FIG. 5, while the operations of reading and writing data thereof are different. In this embodiment, CAs 20A, 20B are arranged instated of the CAs 2A, 2B shown in FIG. 5, and CMs 30A, 30B, 30C, and 30D are arranged instead of the CMs 3A, 3B, 3C, and 3D shown in FIG. 5. The plural CMs are of the same configuration, and the CM 30A will be explained hereinafter. The CM 30A includes a CM control unit 301A, a local cache 32A, and a mirror cache 33A.

Firstly, the operation of writing data in the RAID apparatus in the first embodiment will be explained with reference to FIG. 1. Hereinafter, the case of writing data to the local cache 32A of the CM 30A and to the mirror cache 33B of the CM 30B will be explained. In this case, the disk 5A is the primary disk, while the disk 5D is the secondary disk.

In this example, the writing back is carried out using data of both the local cache and the mirror cache. At first, the host computer 1 sends data to be written to the RAID apparatus 60 to the CA 20A. The CA 20A writes data sent from the host computer 1 to both the local cache 32A of the CM 30A and the mirror cache 33B of the CM 30B. When writing back contents data of the caches to the disks, the CM control unit 301A writes back data on the local cache 32A to the primary disk 5A, while a CM control unit 301B writes back data on the mirror cache 33B to the secondary disk 5D.

For example, in case writing data to the local cache 32A of the CM 30A is not successfully performed and writing data to the mirror cache 33B of the CM 30B is successfully performed, since the writing back is carried out using data of both the local cache and the mirror cache, even if invalid data is retained in the primary disk 5A, valid data is retained in the secondary disk 5D.

Figure 2:
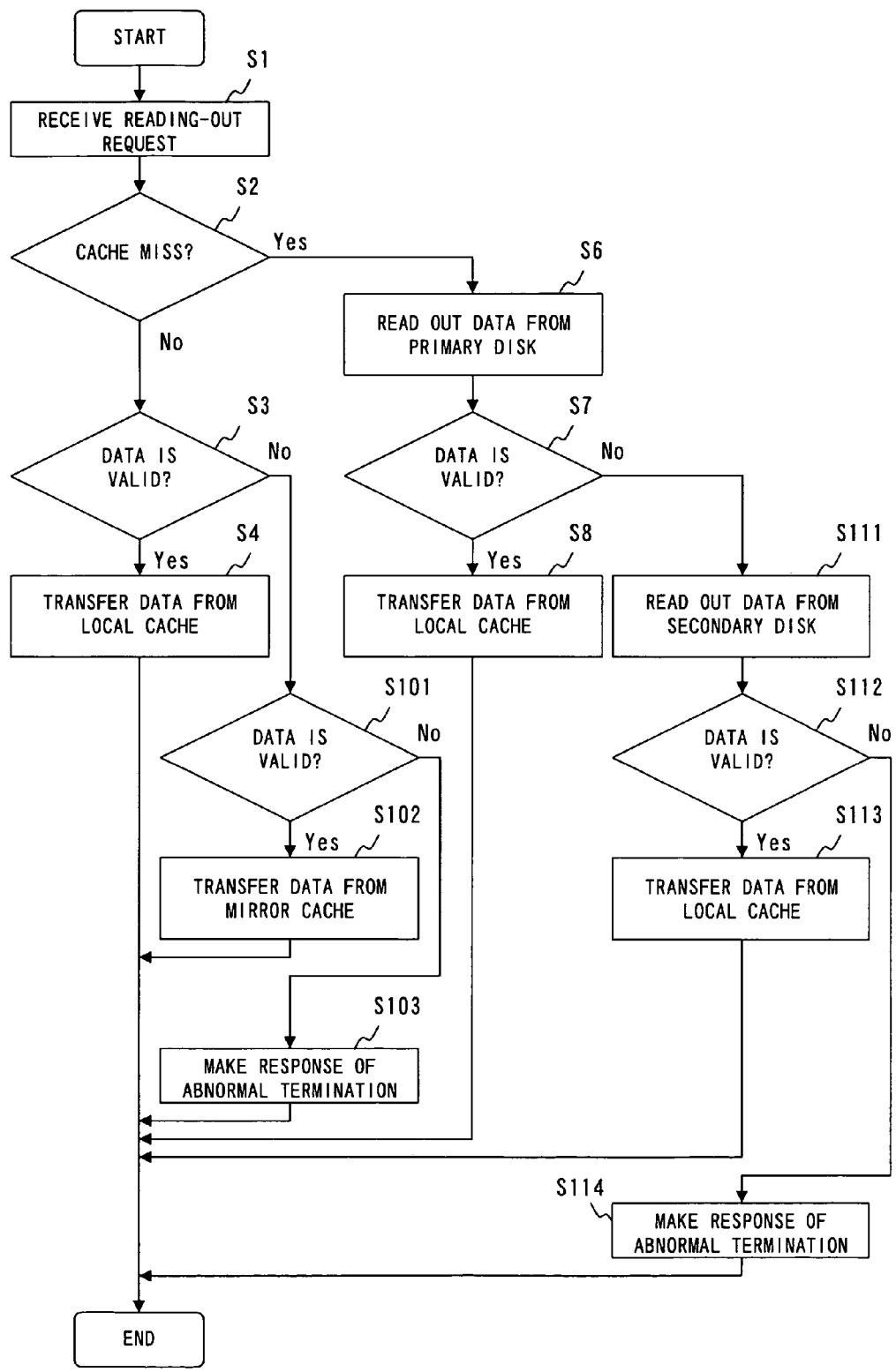
FIG. 2 shows a flow chart for explaining the operation of reading out data in the RAID apparatus according to a first embodiment.

Next, the operation of reading out data in the RAID apparatus in the first embodiment will be explained referring to FIG. 2. FIG. 2 shows a flow chart for explaining the operation of reading out data in this embodiment. Hereinafter, the case of reading out data from the local cache 32A of the CM 30A, after the writing operation illustrated using FIG. 1, will be explained. In FIG. 2, the processing similar to that shown in FIG. 7 is indicated by the same step number.

In this embodiment, in case data required by the host computer 1 cache hits and data on the local cache is invalid, data on the mirror cache is transferred to the host computer 1.

Figure 7:
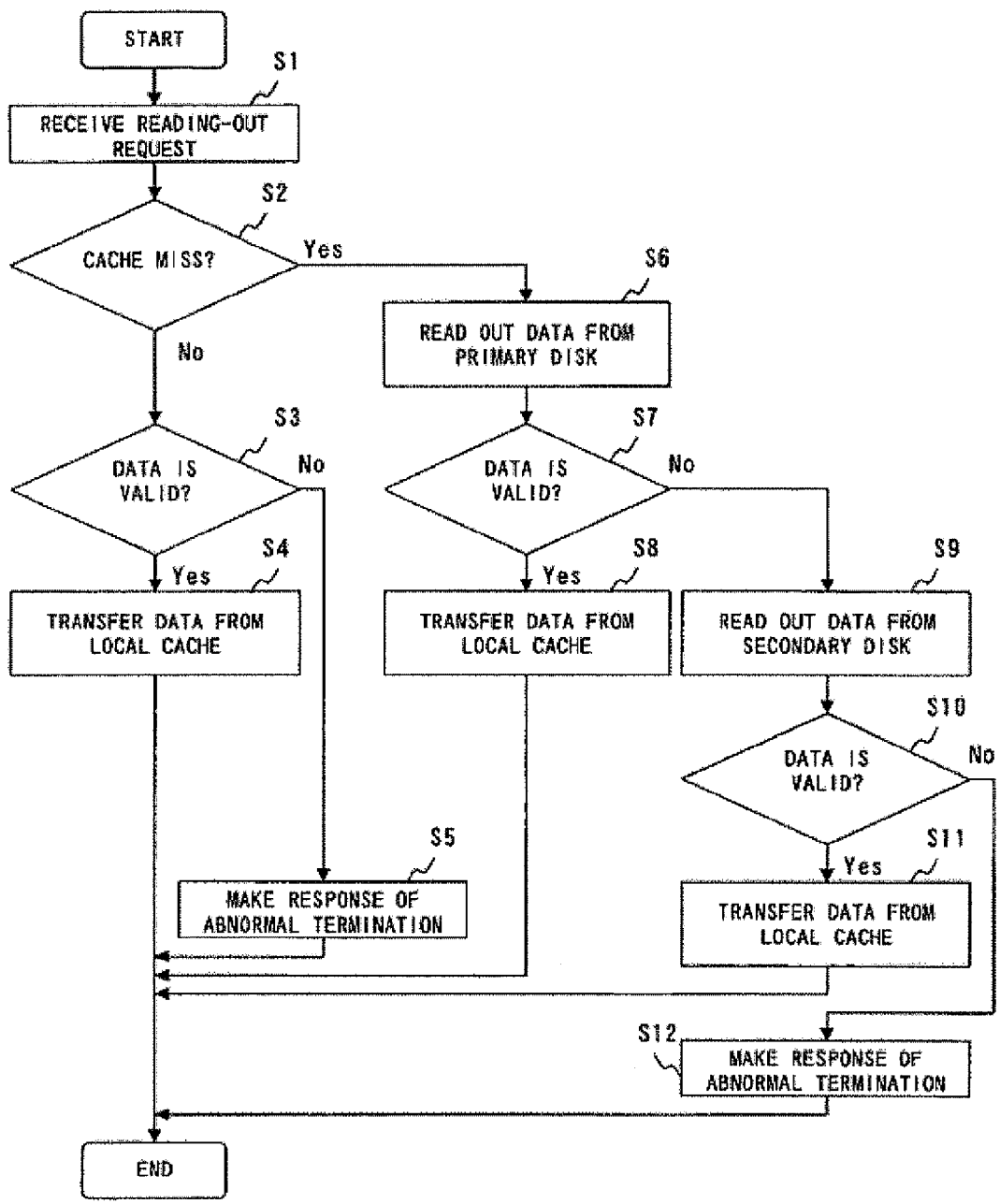
FIG. 7 shows a flow chart for explaining the operation of reading out data in the conventional RAID apparatus.

Specifically, after the processing comes to step S3 similar to the case shown in FIG. 7, in case the data on the local cache 32A that cache hits is valid (S3, Yes), the processing goes to step S4, similar to the case shown in FIG. 7. On the other hand, in case the data on the local cache 32A that cache hits is invalid (S3, No), data is read out from the mirror cache 33B of the CM 30B and the validity of thus read out data is checked using a CC (S101).

In case the data on the mirror cache 33B is valid (S101, Yes), the CA 20A notifies the CM control unit 301B that the data is valid, and the CM control unit 301B transfers the data on the mirror cache 33B to the host computer 1 (S102), ending the processing. On the other hand, in case the data on the mirror cache 33B is invalid (S101, No), the CA 20A notifies the CM control unit 301B that the data is invalid, and the CM control unit 301B makes a response of abnormal termination to the host computer 1 (S103), ending the processing.

In this embodiment, in case data required by the host computer 1 cache misses and data read out from the primary disk to the local cache is invalid, data is read out from the secondary disk to the mirror cache and the data on the mirror cache is transferred to the host computer 1.

Specifically, after the processing comes to step S7 similar to the case shown in FIG. 7, in case the data read out from the primary disk 5A is valid (S7, Yes), the processing goes to step S8, similar to the case shown in FIG. 7. On the other hand, in case the data read out from the primary disk 5A is invalid (S7, No), the CA 20A notifies the CM control unit 301A that the data is invalid, and the CM control unit 301A requests the DA 4B to expand data of the secondary disk 5D onto the local cache 32A. Next, the DA 4B reads out data from the secondary disk 5D to expand thus read out data onto the local cache 32A (S111). Next, the CA 20A reads out data from the local cache 32A, and checks the validity of thus read out data using a CC (S112).

In case the data read out from the secondary disk 5D is valid (S112, Yes), the CA 20A notifies the CM control unit 301A that the data is valid, and the CM control unit 301A transfers the data on the local cache 32A to the host computer 1 (S113), ending the processing. On the other hand, in case the data read out from the secondary disk 5D is invalid (S112, No), the CA 20A notifies the CM control unit 301A that the data is invalid, and the CM control unit 301A makes a response of abnormal termination to the host computer 1 (S114), ending the processing.

As in the above, at the time of reading out data, by reading out data on the mirror cache in case data on the local cache is invalid, data can be recovered. Furthermore, since the writing back is carried out using data of both the local cache and the mirror cache, the possibility that both the primary disk and the secondary disk cannot be read becomes extremely low, which can improve reliability of data.

Second Embodiment

The configuration of a RAID apparatus in the second embodiment is similar to that in the first embodiment. In the second embodiment, the CM control unit 301A is further provided with a function of recording that data read out from the primary disk is invalid.

Figure 3:
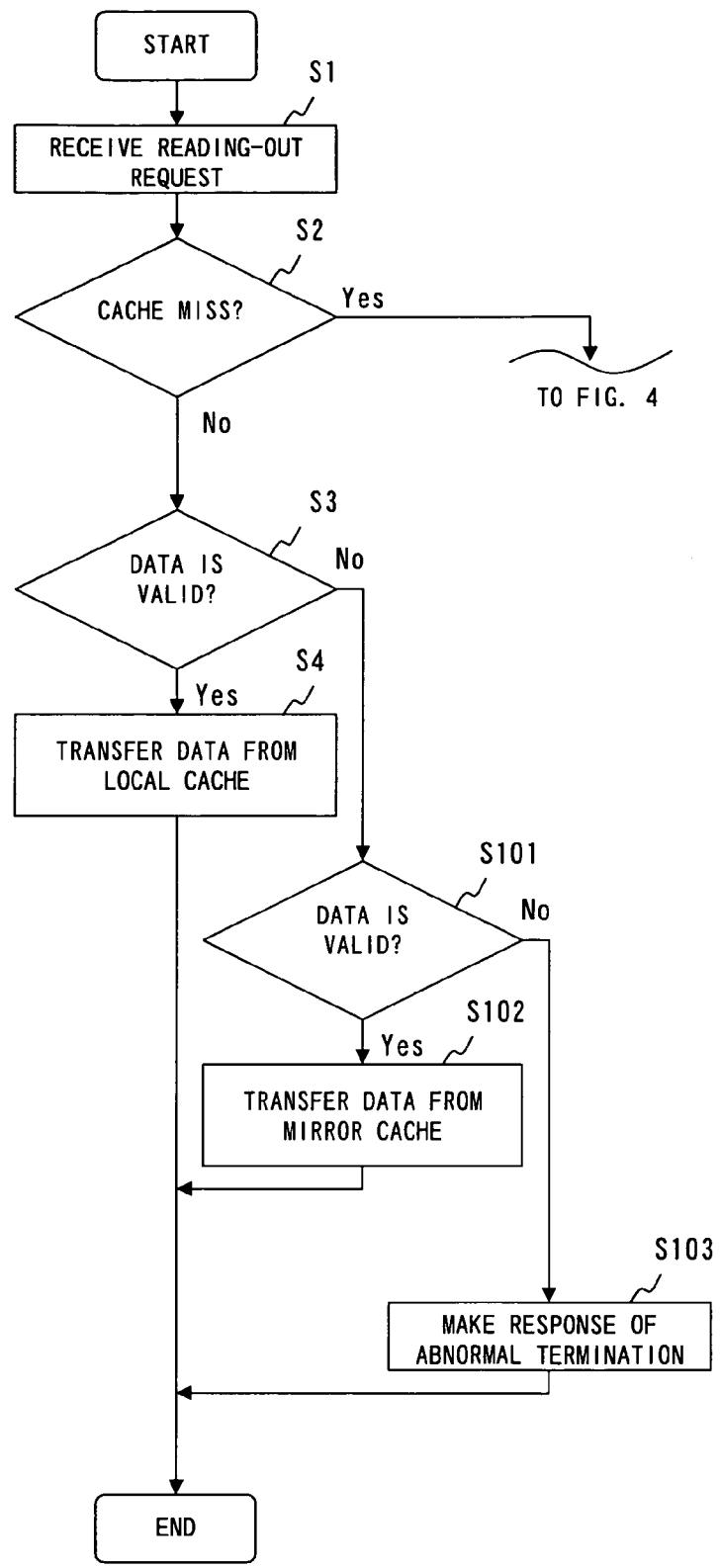
FIG. 3 shows a flow chart for explaining the operation of reading out data in the RAID apparatus according to a second embodiment.
Figure 4:
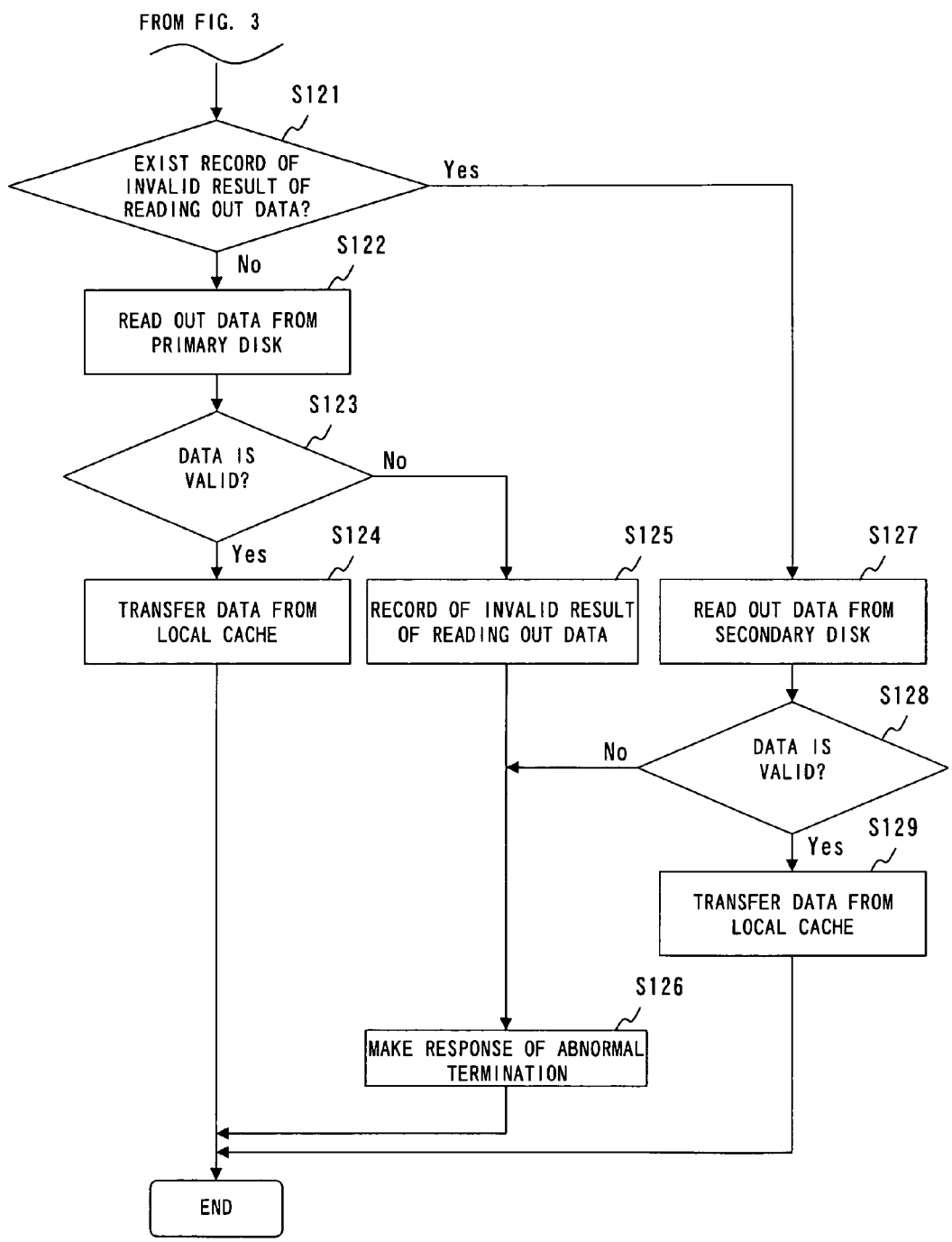
FIG. 4 shows a flow chart continuing from that shown in FIG. 3.

Next, the operation of reading out data in the RAID apparatus in the second embodiment will be explained referring to FIG. 3 and FIG. 4. FIG. 3 and FIG. 4 show flow charts for explaining the operation of reading out data in the second embodiment. The operation of the RAID apparatus in the second embodiment is substantially similar to that in the first embodiment. In the flow of reading out data, the operation at the time of a cache miss is different. Hereinafter, the case of reading out data from the local cache 32A of the CM 30A after the writing operation illustrated in the first embodiment will be explained. In FIG. 3, the processing similar to that shown in FIG. 7 is indicated by the same step number.

In the case of cache miss (S2, Yes), the CM control unit 301A judges whether or not there exists a record of invalid result of reading out data from the primary disk 5A (S121). In case data read out from the primary disk 5A in response to the previous reading-out request is invalid, the CM control unit 301A records invalid result of reading out data from the primary disk 5A.

In case there exists no record of invalid result of reading out data from the primary disk 5A (S121, No), the CM control unit 301A requests the DA 4A to expand data of the primary disk 5A onto the local cache 32A. Next, the DA 4A reads out data from the primary disk 5A to expand thus read out data onto the local cache 32A (S122). Next, the CA 20A reads out data from the local cache 32A, and checks the validity of the data read out from the primary disk 5A using a CC (S123).

In case the data read out from the primary disk 5A is valid (S123, Yes), the CA 20A notifies the CM control unit 301A that the data is valid, and the CM control unit 301A transfers the data on the local cache 32A to the host computer 1 (S124), ending the processing. On the other hand, in case the data read out from the primary disk 5A is invalid (S123, No), the CA 20A notifies the CM control unit 301A that the data is invalid, and the CM control unit 301A records invalid result of reading out data from the primary disk 5A (S125). Next, the CM control unit 301A makes a response of abnormal termination to the host computer 1 (S126), ending the processing.

On the other hand, in case there exists a record of invalid result of reading out data from the primary disk 5A (S121, Yes), the CM control unit 301A requests the DA 4B to expand data of the secondary disk 5D onto the local cache 32A. Next, the DA 4B reads out data from the secondary disk 5D to expand thus read out data onto the local cache 32A (S127). Next, the CA 20A reads out data from the local cache 32A, and checks the validity of the data read out from the secondary disk 5D using a CC (S128).

In case the data read out from the secondary disk 5D is valid (S128, Yes), the CA 20A notifies the CM control unit 301A that the data is valid, and the CM control unit 301A transfers the data on the local cache 32A to the host computer 1 (S129), ending the processing. On the other hand, in case the data read out from the secondary disk 5D is invalid (S128, No), the CA 20A notifies the CM control unit 301A that the data is invalid, and the CM control unit 301A makes a response of abnormal termination to the host computer 1 (S126), ending the processing.

As described in the above, by recording that the data read out from the primary disk in response to the previous reading-out request is invalid, and reading out data from the secondary disk in response to the following reading-out request, data can be recovered utilizing host retry.

In the above-described embodiments, the case of duplicating the cache and the disk is explained. However, the present invention can be applied to the case in which three or more caches and disks are arranged to be multiplexed.

INDUSTRIAL APPLICABILITY

As described in the above, according to the present invention, by writing and reading data using different CMs and paths, reliability of retained data can be improved.

The invention claimed is:

1. A RAID apparatus that at least duplicates identical data to store thus duplicated data, comprising:
    at least one disk unit that stores the data;
    a plurality of cache units, both of which has a local cache and a mirror cache to transiently store data;
    a control unit that, when an instruction of writing data is given from a host computer, writes data to a local cache of a first cache unit being one of the plural cache units and to a mirror cache of a second cache unit being one of the cache units other than the first cache unit, writes data of the local cache of the first cache unit to a first area of the disk unit and writes data of the mirror cache of the second cache unit to a second area other than the first area by using a different path; wherein
    when an instruction of reading out data is given from the host computer, and data specified by the instruction is retained in the local cache and mirror cache units, the control unit judges whether or not data specified by the instruction in the local cache of the first cache unit and data specified by the instruction in the mirror cache of the second cache unit are valid based on an error detection code to output the valid data;
    when the instruction of reading out data is given from the host computer, and data specified by the instruction is not retained in the local cache and mirror cache units, the control unit judges whether or not data specified by the instruction in the first area is valid based on an error detection code, and stores the judgment that the data specified by the instruction in the first area is invalid when the specified data in the first area is invalid to make a response of abnormal termination to outside, and when a second instruction of reading out data is given from the host computer, the control unit outputs data specified by the second instruction in the second area.

2. The RAID apparatus according to claim 1, wherein:
when an instruction of reading out data is given from the host computer, and specified data is not retained in the cache units, the control unit judges whether or not specified data in the first area and specified data in the second area are valid based on an error detection code to output the valid data.

3. A RAID control method that at least duplicates identical data to store thus duplicated data, comprising:
a step that, when an instruction of writing data is given from a host computer, writes data to a local cache of a first cache unit being one of a plurality of cache units each of which has a local cache and a mirror cache and to a mirror cache of a second cache unit being one of the cache units other than the first cache unit;
a step that writes data of the local cache of the first cache unit to a first area of a disk unit;
a step that writes data of the mirror cache of the second cache unit to a second area of the disk unit; and
a step that, when an instruction of reading out data is given from the host computer, and data specified by the instruction is retained in the local cache and mirror cache units, the control unit judges whether or not data specified by the instruction in the local cache of the first cache unit and data specified by the instruction in the mirror cache of the second cache unit are valid based on an error detection code to output the valid data;
a step that, when the instruction of reading out data is given from the host computer, and data specified by the instruction is not retained in the local cache and mirror cache units, the control unit judges whether or not data specified by the instruction in the first area is valid based on an error detection code, and stores the judgment that the data specified by the instruction in the first area is invalid when the specified data in the first area is invalid to make a response of abnormal termination to outside, and when a second instruction of reading out data is given from the host computer, the control unit outputs data specified by the second instruction in the second area.

4. The RAID control method according to claim 3, comprising:
a step that, when an instruction of reading out data is given from the host computer, and specified data is not retained in the cache units, judges whether or not specified data in the first area and specified data in the second area are valid based on an error detection code to output the valid data.

5. A computer readable medium storing a RAID control program that makes a computer carry out a RAID control method that at least duplicates identical data to store thus duplicated data, the RAID control method comprising:
a step that, when an instruction of writing data is given from a host computer, writes data to a local cache of a first cache unit being one of a plurality of cache units each of which has a local cache and a mirror cache and to a mirror cache of a second cache unit being one of the cache units other than the first cache unit;
a step that writes data of the local cache of the first cache unit to a first area of a disk unit;
a step that writes data of the mirror cache of the second cache unit to a second area of the disk unit; and
a step that, when an instruction of reading out data is given from the host computer, and data specified by the instruction is retained in the local cache and mirror cache units, the control unit judges whether or not data specified by the instruction in the local cache of the first cache unit and data specified by the instruction in the mirror cache of the second cache unit are valid based on an error detection code to output the valid data;
a step that, when the instruction of reading out data is given from the host computer, and data specified by the instruction is not retained in the local cache and mirror cache units, the control unit judges whether or not data specified by the instruction in the first area is valid based on an error detection code, and stores the judgment that the data specified by the instruction in the first area is invalid when the specified data in the first area is invalid to make a response of abnormal termination to outside, and when a second instruction of reading out data is given from the host computer, the control unit outputs data specified by the second instruction in the second area.

6. The computer readable medium storing the RAID control program according to claim 5, comprising:
a step that, when an instruction of reading out data is given from the host computer, and specified data is not retained in the cache units, judges whether or not specified data in the first area and specified data in the second area are valid based on an error detection code to output the valid data.

7. A RAID apparatus that at least duplicates identical data to store thus duplicated data, comprising:
at least one disk unit that stores the data;
a plurality of cache units, both of which has a local cache and a mirror cache to transiently store data;
a control unit that, when an instruction of writing data is given from a host computer, writes data to a local cache of a first cache unit being one of the plural cache units and to a mirror cache of a second cache unit being one of the cache units other than the first cache unit, writes data of the local cache of the first cache unit to a first area of the disk unit and writes data of the mirror cache of the second cache unit to a second area other than the first area by using a different path; wherein
when an instruction of reading out data is given from the host computer, and data specified by the instruction is retained in the local cache and mirror cache units, the control unit judges whether or not data specified by the instruction in the local cache of the first cache unit and data specified by the instruction in the mirror cache of the second cache unit are valid based on an error detection code to output the valid data;
when an instruction of reading out data is given from the host computer, and specified data is not retained in the cache units, the control unit reads out specified data from the first area and judges whether specified data in the first area is invalid or not based on an error detection code, if specified data in the first area is invalid, reads out specified data from the second area to output valid data.

* * * * *

UNITED STATES PATENT AND TRADEMARK OFFICE
CERTIFICATE OF CORRECTION

PATENT NO. : 7,610,446 B2 Page 1 of 1
APPLICATION NO. : 11/138278
DATED : October 27, 2009
INVENTOR(S) : Akihito Kobayashi et al.

It is certified that error appears in the above-identified patent and that said Letters Patent is hereby corrected as shown below:

Column 1, Line 4, after "This" delete "is".

Column 1, Line 8, change "JP03107786," to --JP03/07786,--.

Signed and Sealed this

Nineteenth Day of January, 2010

David J. Kappos
*Director of the United States Patent and Trademark Office*